Patented Feb. 12, 1929.

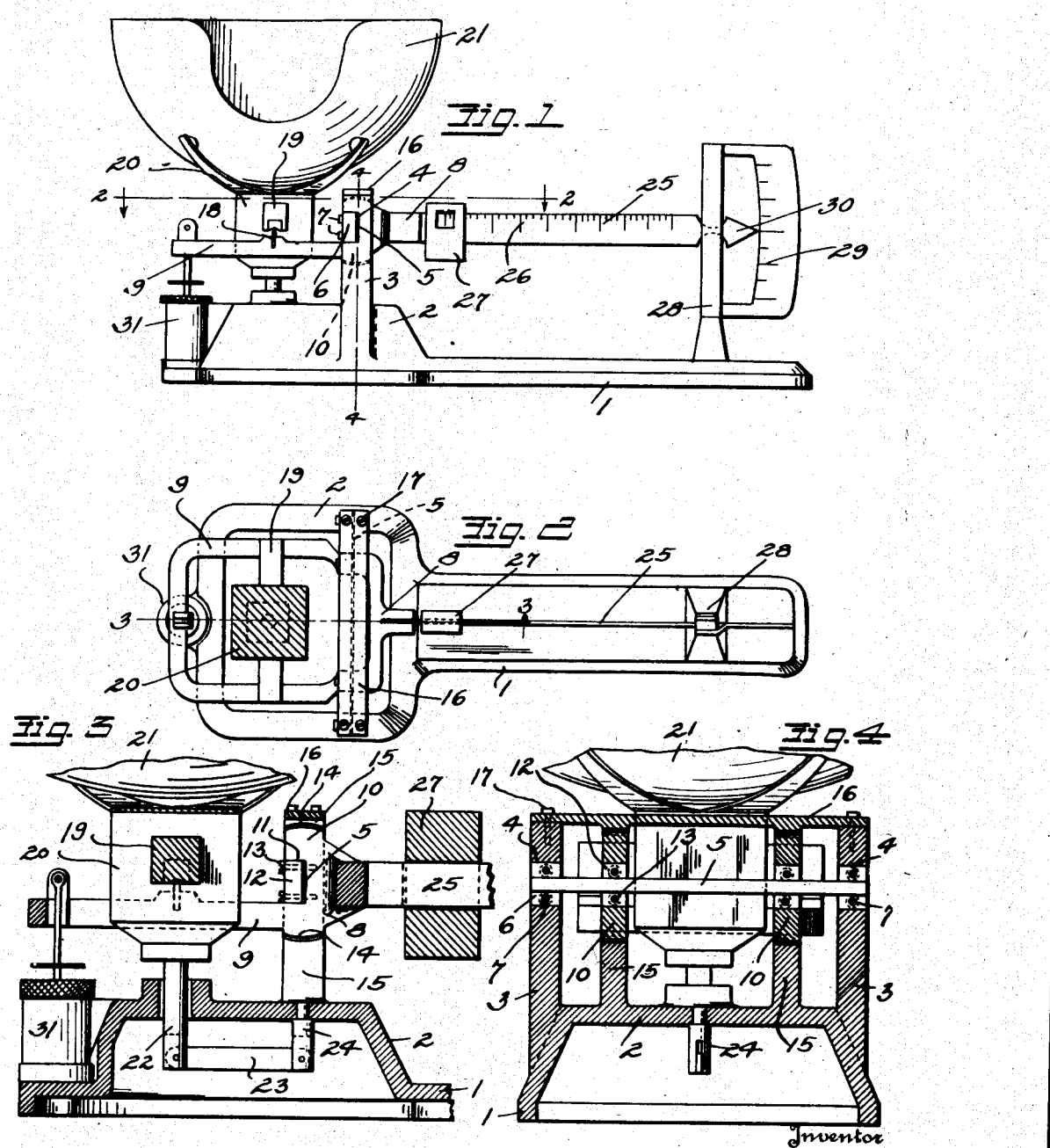

1,701,642

UNITED STATES PATENT OFFICE.

WALTER S. SMITH, OF COLUMBUS, OHIO.

SCALE.

Application filed June 8, 1927, Serial No. 197,448. Renewed September 24, 1928.

This invention relates to improvements in scales, and has particular reference to scales of the type utilizing an even balanced beam and wherein the beam is movably mounted adjacent to its center of gravity in order that the applied weight on one end of said beam may be balanced or offset by an adjustable weight carried by the other end or portion of said beam.
Among the objects of the invention are: The provision of a torsional support upon which the beam is movably carried; the provision of means for protecting the torsional support from undue stress and injury when the scale is roughly used or handled; in constructing one end of the beam to constitute an indicator, which is movable over a graduated surface to denote when the beam occupies a true state of balance, and in the provision of a scale of simple and economical form, capable of being readily manufactured and of such construction as to indicate accurately and sensitively the weight of the bodies or materials applied thereto with utmost precision in so far as practical everyday weighing operations are concerned.

With these and other objects in view, as will appear as the description proceeds, the invention consists in the novel features of construction, combinations of elements and arrangements of parts hereinafter to be more fully described and pointed out in the appended claims.

In the accompanying drawing:
Figure 1 is a side elevation of a scale constructed in accordance with the present invention.

Figure 2 is a horizontal sectional view taken on the plane indicated by the line 2—2 of Figure 1.

Figure 3 is a vertical longitudinal sectional view taken through the scale on the line 3—3 of Figure 2.

Figure 4 is a transverse vertical sectional view on the plane indicated by the line 4—4 of Figure 1.

Referring more particularly to the drawings the numeral 1 designates the base of my improved scale. This base is preferably formed from cast aluminum so as to be relatively light in weight and at the same time to present an attractive appearance. The base is adapted to rest slightly upon a counter, show case or other support and in this instance is formed to provide an integral housing 2 at one end thereof.

Arising from the housing are transversely spaced integral posts 3, which are recessed as at 4 for the reception of the ends of a torsion strip 5. The ends of this strip are securely clamped against movement within the recesses 4 by the provision of blocks or their equivalent 6, which are held in place by means of screws or the like 7.

The weighing beam 8 of the scale includes a substantially rectangular portion 9, which is arranged immediately over the housing 2. This rectangular portion of the scale is formed to comprise a pair of spaced enlargements 10, which are recessed as at 11 for the reception of the torsion strip 5, and blocks 12 are arranged to be fitted within the recesses 11 and held by means of screws 13 so as to securely clamp the beam in connection with the torsion strip so that the beam will be movably or pivotally supported by said strip.

The enlargements 10 have the upper and lower edges thereof rounded as indicated at 14 and are confined between upright webs 15, formed in connection with the base and similar webs provided upon the lower surfaces of a transversely extending bar 16, the end of the latter being secured as at 17 to the posts 3. It will be observed that the rounded edge portions 14 of the enlargements 10 are slightly spaced from the complemental surfaces of the webs 15, in order that said webs will not frictionally engage with the enlargements during normal operation on the part of the beam. However, in the event that the scale is roughly handled the enlargements 10 may engage with said webs to protect the torsion strip from injury and to prevent the same from receiving stresses and strains which it was not designed to absorb.
The rectangular portion 9 of the beam 8 is provided with spaced knife edges 18 which engage with hardened steel blocks provided in connection with transversely disposed studs 19 which project from the body of the weight receiver 20. In this instance the weight receiver has been shown as provided with a removable pan or platter 21. The lower end of the weight receiver terminates in a stem 22 which passes through an opening in the top of the housing 2 and has its lower end pivotally connected with a check rod 23, the opposite ends of said check rod being pivotally connected with a support 24 depending from the top of the housing and located in alignment with the torsion strip 5. This construction provides the necessary parallelogram weighing figure.

The beam 8 on the opposite side of the torsion strip, as regards the rectangular portion 9, is formed to comprise a horizontally extending bar 25, which has its inner end securely positioned and held within a slot provided in the rectangular portion 9. The bar 25 is provided with suitable weight graduations 26, indicating ounces and pounds. Slidably mounted on the bar 25 is an adjustable poise or weight 27, which is manually set, as usual, to balance the applied weight placed within the pan or platter 21. The outer end of the bar 25 terminates within a slot provided in a weight indicator 28, which is vertically positioned upon one end of the base 1. This indicator is provided with a graduated surface 29 for indicating under and over weights, and the bar 25 terminates, adjacent to the surface 29, in an indicator or pointer 30, whereby in the operation of the scale a clear and sensitive indication is to be had so as to enable the operator of the scale to determine definitely and accurately when the beam is in a true state of balance for any given weight adjustment. The length of the bar 25 permits the indicator end thereof to travel substantially one inch to every ounce of applied weight, so that the operator will have little or no difficulty in determining proper weight balances. The opposite ends of the beam may be provided with the usual dash pot construction 31, for stabilizing the oscillation of the beam in response to applied weights.

In view of the foregoing it will be seen that the present invention provides a simple, efficient and economical weighing scale capable of indicating with greatest accuracy the applied weight of any given operation and, moreover, a scale is provided which need not occupy a true horizontal plane to maintain its accuracy, since by the provision of the even balanced beam a true horizontal level is not needed. Again, the scale is rendered extremely sensitive by employing the torsion strip as the main support for the movable beam, eliminating thereby the friction and error which is usually present in the knife edge type of construction. Then, the scale includes a beam so constructed as to prevent the application of abnormal stresses and strains to the torsion supporting strip, thereby retaining the sensitiveness of the latter but at the same time producing a type of scale which is not apt to become out of order or require repair. By combining the indicator with the beam the construction of the scale is simplified mechanically and the use of extra movable parts has been avoided.

While I have described my invention in detail, it will be understood that many variations will appear to one skilled in the art within the scope of my invention and within the scope of the subjoined claims.

What is claimed is:

1. In a scale, a base, a transversely extending torsion strip secured at its ends to said base, a beam having its intermediate portion secured to said strip between the ends of the latter, a weight receiver on one end of said beam, an adjustable weight on the other end of said beam, and stationary stop means carried by said base and disposed adjacent to said strip, said stop means being normally out of engagement with said beam but capable of engaging therewith to relieve stress and strain on said torsion strip upon the application of abnormal forces to said beam.

2. In a scale, an even balanced beam, a base, a transversely extending torsion strip secured at its ends to said base, said strip having the intermediate portion thereof connected with said beam to sustain the weight of the latter, and means operable upon the application of an abnormal load to said beam to transfer partially the weight of the latter to said base in order to relieve said strip of such abnormal loads.

3. In a scale, a base, a transversely extending torsion strip having the opposite ends thereof secured to said base, a weighing beam secured to said strip between the ends thereof, said strip serving to movably support said beam, a weight receiver carried by said beam on one side of said strip, an adjustable weight carried by said beam on the other side of said strip, and means normally out of engagement with said beam but responsive to the application of abnormal loads thereto to transfer the weight of said beam and said receiver directly to said base.

4. In a scale, a base, a pair of upright posts arising from said base and spaced transversely, a torsion strip having the ends thereof secured to said posts, a weight receiver having the intermediate portion thereof formed to comprise a head, said head being directly secured to said strip at positions between the ends of the latter, and stop means carried by said base and normally slightly spaced from said head, the spacing between said head and stop means being such that when abnormal loads are applied to said beam said head will engage with said stop means to relieve the torsion strip of abnormal stress and strains.

5. In a scale, a base, a supporting frame arising from said base, a transversely extending torsion strip having the opposite ends thereof secured rigidly to said frame, an even balanced beam provided intermediately of its length with a head, securing means for uniting said head to the intermediate portions of said strip whereby the latter serves normally to support said beam, and webs formed with said frame and disposed normally in slightly spaced relationship from said head, the spacing between said head and said webs being such that when the scale is subjected to abnormal forces said webs and heads will be brought into direct engagement to relieve the torsion strip from deleterious strains.

In testimony whereof I affix my signature.

WALTER S. SMITH.